Jan. 12, 1926. 1,569,628
D. M. GOETSCHIUS ET AL
FILTER
Filed August 25, 1922   2 Sheets-Sheet 1
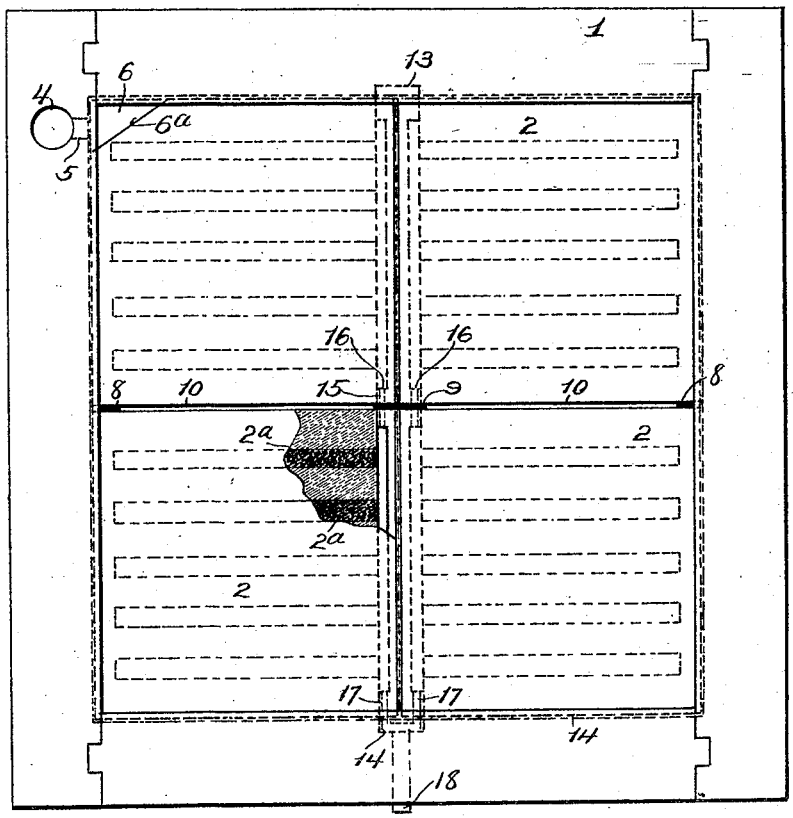
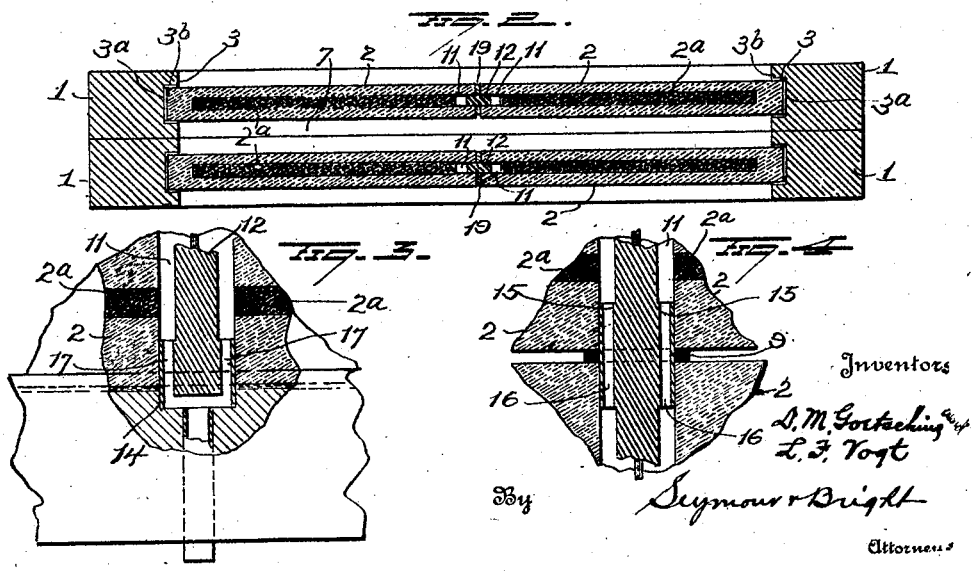
Inventors
D. M. Goetschius
L. J. Vogt
By Seymour & Bright
Attorneys

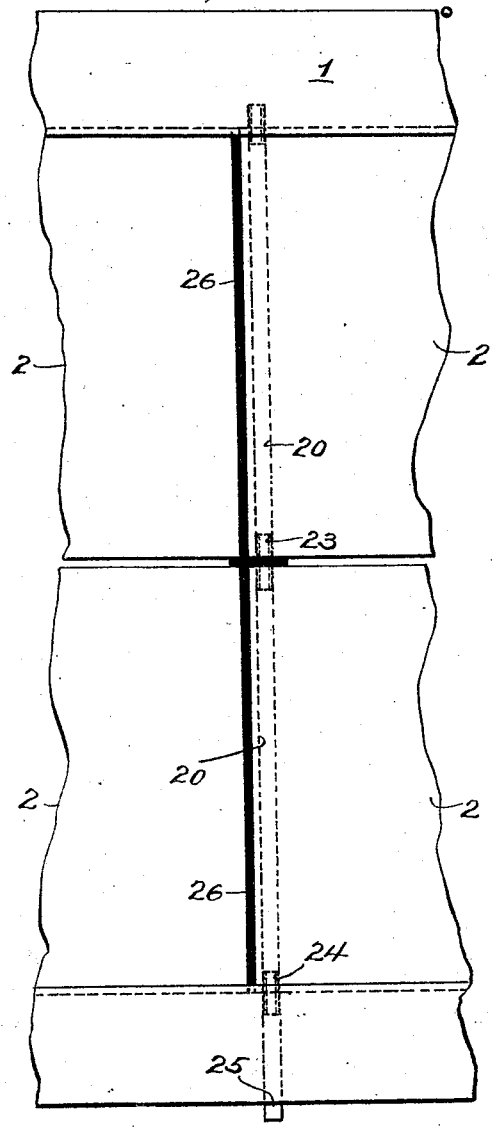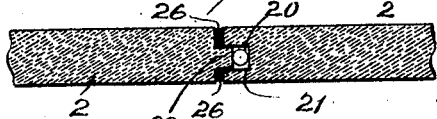

Patented Jan. 12, 1926.

1,569,628

UNITED STATES PATENT OFFICE.

DALTON M. GOETSCHIUS, OF CANONSBURG, AND LOUIS F. VOGT, OF WASHINGTON, PENNSYLVANIA, ASSIGNORS TO STANDARD CHEMICAL COMPANY, OF PITTSBURGH, PENNSYLVANIA.

FILTER.

Application filed August 25, 1922. Serial No. 584,379.

*To all whom it may concern:*

Be it known that we, DALTON M. GOETSCHIUS and LOUIS F. VOGT, citizens of the United States, and residents of Canonsburg and Washington, in the county of Washington and State of Pennsylvania, respectively, have invented certain new and useful Improvements in Filters; and we do hereby declare the following to be a full, clear, and exact description of the invention, such as will enable others skilled in the art to which it appertains to make and use the same.

This invention relates to improvements in filters and more particularly to such as comprise a plurality of parallel units with intervening filter chambers.

One object of our present invention is to so construct a filter intended especially for use in separating solids from acid or corrosive liquid, that the use of filter cloths shall be obviated and so that the filter media shall consist solely of porous stone blocks or sections assembled in such manner in a frame that when a plurality of such units shall have been assembled, intervening filter chambers shall be formed, and so that the filtrate from the inner edge portions of the several stones of a unit shall find an exit through one or more discharge passages located centrally in each unit.

With this and other objects in view, the invention consists in certain novel features of construction and combinations of parts as hereinafter set forth and pointed out in the claims.

In the accompanying drawings; Figure 1 is a view partly in section and partly in elevation showing an embodiment of our invention; Figure 2 is a transverse sectional view showing the association of two units; Figures 3 and 4 are enlarged detail sectional views, and Figures 5 and 6 are views illustrating a modified construction.

Each unit or leaf of the filter includes a frame 1, of non-corrosive and acid-proof material, such as wood for example, or said frame might be made of other material if the same be coated or covered with acid resisting material, such as rubber. Each unit also includes a series of filter blocks or stone sections 2 seated in grooves 3 in the inner sides of the members of said frame, said grooves having gaskets 3ª and calking 3ᵇ therein. In the embodiment of the invention shown in Figures 1 and 2, the frame 1 is shown as being square with four filter stones or sections, but it will be understood that said frame may have other rectangular configuration or it may be made circular if so desired, and a greater or less number of filter blocks or sections may be employed within the frame.

Each frame 1 is provided in one of its side members (preferably near the upper left hand corner of the frame) with inlet duct portions 4 so that when a plurality of frames are assembled, a continuous inlet duct will be formed. A lateral duct 5 communicates with each duct portion 4 and the inner ends of these ducts communicate with filling and equalizing ports 6,—the latter being formed by beveling the upper left-hand corner portion of each left hand block or stone 2, as indicated at 6ª. The ports 6 communicate with filter chambers 7 formed between the filter blocks or stones of adjacent units or leaves. The filter blocks or stones of each unit are separated from each other by spacers 8 and 9 of hard rubber or other non-corrosive material, and form additional equalizing ports 10, the said spacers also serving to seal the ends of the ports 10 and also to assist in lending flexibility to the filter structure.

Each filter block or section 2 may be composed of porous stone of comparatively fine grain but in the embodiment of the invention shown in the drawings, each stone filter section comprises not only a body portion of fine grain stone, but also a plurality of interior cores 2ª which may be inserted into suitable bores formed in the body portion of the stone or section, each of said bores being closed at one end and the coarse grain core extending to one edge only of the stone. With such construction, the liquid, after passing through the fine-grain portions of the stone, will be subjected to reduced resistance by the coarse-grain cores as it passes to a filtrate discharge passage provided therefor in the vertical central portion of each unit as hereinafter described.

The filter stones or sections are so disposed within the frame, that the inner edges thereof at which the coarse-grain cores terminate will be located in proximity to the vertical center of the unit. In the embodiment of the invention shown in Figures 1 and 2 of the drawings, the inner edge of each filter stone or section is made with a vertical groove forming filtrate outlet passages 11 divided by a tongue or strip 12 of non-corrosive material, the respective edges of which enter the opposed grooves. The upper end of the strip or tongue is made with an enlarged portion 13 which enters a socket in the upper member of the frame 1 and its lower end is made with an enlargement 14 which enters a suitable socket in the lower member of the frame. The intermediate portion of the strip or tongue 12 is made with an enlargement 15 extending from somewhat above the lower edges of upper stone sections to a point somewhat below the upper edges of the lower stone sections, and the intermediate enlargement 15 extends through the central spacer 9. The intermediate enlargement 15 of the strip or tongue 12 is provided with ducts 16 which connect the discharge passages in the upper stones with those in the lower stones, and the lower enlargement 14 of said strip or tongue is provided with ducts 17 which connect the lower ends of the discharge passages 11 with an outlet duct or pipe 18 in the lower member of the frame 1. In order to guard against the entrance of pulp from the filter chamber or from the spaces between the stone filter sections into the discharge passages, suitable packing or calking 19, such as asbestos for example, is located between the meeting edges of the filter stones adjacent to the filtrate discharge passages.

Instead of forming two central filtrate discharge passages as above described, a single filtrate discharge passage 20, such as shown in Figures 5 and 6 may be provided. In this embodiment of our invention, the filtrate discharge passage is formed by providing the edge portions of the stone filter sections at one side of the vertical center of the unit, with aligning grooves 21 and providing the edges of the adjacent filter stone sections with ribs 22 to enter such grooves. A thimble or tube 23 may be employed to connect the portion of the discharge passage in the upper stone with the portion of said passage in the lower stone, and a similar thimble or tube 24 may be employed to connect the lower end of the discharge passage with an outlet duct or pipe 25 in the lower member of the frame 1. Calking 26 is placed between the meeting edges of the filter stone sections at respective sides of the ribs 22.

Various changes might be made in the details of construction of our invention without departing from the spirit thereof or limiting its scope and hence we do not restrict ourselves to the precise details herein set forth.

Having fully described our invention, what we claim as new and desire to secure by Letters-Patent, is:—

1. In a filter of the character described, the combination of a plurality of units each comprising a frame and a plurality of filter stones disposed in the plane of the frame and edge to edge, the filter stones of adjacent units forming a filter chamber between their opposed side faces, means for feeding mixed liquids and solids to said filter chamber, and intermediate filtrate discharge passages between the inner opposed edges of adjacent filter stones and into which the stones discharge through their inner edge portions.

2. A filter comprising a plurality of units forming interposed filter chambers between their opposed sides and each unit comprising a frame and a plurality of filter stone sections carried by and arranged edge to edge in the plane of the frame, non-corrosive spacers disposed between the edges of superimposed stone sections, a non-corrosive member disposed between the edges of these stone sections which lie in the same horizontal plane, said member forming with said stone sections discharge means for filtrate received from the filter stone sections, and means for conducting liquid containing solids to the filter chambers.

3. In a filter of the character described, the combination of filter stones forming a filter chamber between the opposed faces of stones arranged side by side, each of said filter stones comprising a fine-grain body having an interior passage closed at one edge of the stone and open at the opposite edge thereof, the latter edge being opposed to the similar edge of an adjacent stone, and filtrate discharge means disposd between said opposed edges of adjacent stones and in direct communication with the open sides of the interior passages in the stones.

4. In a filter of the character described, a filter unit comprising a frame, a plurality of porous stone filter sections in said frame, inner edges of said stone sections having vertical grooves forming filtrate discharge passages intermediate of parallel edge portions of adjacent filter stone sections, and a strip or tongue disposed between said stone sections and entering the grooves in the inner edges thereof.

5. In a filter of the character described, a filter unit comprising a frame, a plurality of porous stone filter sections in said frame, inner edges of said stone sections having vertical grooves forming filtrate discharge passages intermediate of parallel edge portions of adjacent filter stone sections, and a strip or tongue disposed between said stone sections and entering the grooves in the inner edges thereof, said strip having enlargements at its ends entering the upper and lower members of the frame.

6. In a filter of the character described, a filter unit comprising a frame, a plurality of porous stone filter sections in said frame, inner edge of said stone sections having vertical grooves forming filtrate discharge passages intermediate of parallel edge portions of adjacent filter stone sections, and a strip or tongue disposed between said stone sections and entering the grooves in the inner edges thereof, said strip having enlargements at its ends entering the upper and lower members of the frame, said strip having also an enlarged intermediate portion, the intermediate and lower enlargements of said strip having ducts communicating with the vertical grooves forming the discharge passages.

7. In a filter of the character described, a filter unit comprising a frame, a plurality of porous stone filter sections therein, and intermediate filtrate discharge means adjacent to inner edges of adjacent filter stone sections to receive filtrate from the latter, each stone section comprising a fine grain body and coarse grain core portion, said core portion extending at one end to the intermediate filtrate discharge means and, except at said end, being entirely surrounded by the fine grain body.

8. In a filter of the character described, a filter unit comprising a frame, a plurality of porous stone filter sections in said frame, inner edges of said stone sections having vertical grooves forming filtrate discharge passages intermediate of parallel edge portions of adjacent filter stone sections, and a strip or tongue disposed between said stone sections and entering the grooves in the inner edges thereof, and calking between the filter stone sections at respective sides of said strip or tongue.

In testimony whereof, we have signed this specification.

DALTON M. GOETSCHIUS.
LOUIS F. VOGT.